United States Patent [19]

Stingel, Jr.

[11] Patent Number: 5,779,094

[45] Date of Patent: Jul. 14, 1998

[54] ARTICLE RECEPTION SYSTEM FOR STORAGE AND DISPENSING APPARATUS

[76] Inventor: Frederick J. Stingel, Jr., 2860 Pinckard Pike, Versaille, Ky. 40383

[21] Appl. No.: 589,700

[22] Filed: Jan. 22, 1996

[51] Int. Cl.⁶ ................................................ G07F 11/00
[52] U.S. Cl. ........................................ 221/75; 221/2
[58] Field of Search .................. 221/2, 75, 6, 14; 198/463.3

[56] References Cited

U.S. PATENT DOCUMENTS

| | | |
|---|---|---|
| 296,600 | 4/1884 | Norwood . |
| 342,433 | 5/1886 | Fischer . |
| 409,806 | 8/1889 | Schureman . |
| 1,034,618 | 8/1912 | Holcombe . |
| 2,701,077 | 2/1955 | Palmer . |
| 3,437,235 | 4/1969 | Guerra . |
| 3,477,560 | 11/1969 | Broser . |
| 3,608,776 | 9/1971 | Moe . |
| 3,610,445 | 10/1971 | Kitchen et al. . |
| 3,746,144 | 7/1973 | Englert . |
| 3,805,974 | 4/1974 | Anderrson et al. . |
| 4,130,193 | 12/1978 | Bourgeois . |
| 4,180,182 | 12/1979 | Fish et al. ............ 221/75 |
| 4,273,253 | 6/1981 | Tanaka et al. . |
| 4,485,910 | 12/1984 | Tabler . |
| 4,621,745 | 11/1986 | Grace . |
| 4,983,091 | 1/1991 | Lichti, Sr. et al. . |
| 5,000,643 | 3/1991 | Tanaka et al. . |
| 5,024,572 | 6/1991 | Tanaka et al. . |
| 5,111,963 | 5/1992 | Grace, Sr. . |
| 5,236,104 | 8/1993 | Stingel, Jr. et al. ............ 221/75 |
| 5,252,948 | 10/1993 | Goris et al. ................. 221/2 |
| 5,285,928 | 2/1994 | Stingel, Jr. et al. . |

FOREIGN PATENT DOCUMENTS

| | | |
|---|---|---|
| 453068 | 11/1927 | Germany . |
| 1045134 | 11/1958 | Germany . |
| 1144186 | 2/1963 | Germany . |
| 52-1862 | 6/1977 | Japan . |
| 54-38075 | 3/1979 | Japan . |
| 521191 | 9/1976 | U.S.S.R. . |
| 1044183 | 9/1966 | United Kingdom . |
| 1414022 | 11/1975 | United Kingdom . |
| 2047666 | 12/1980 | United Kingdom . |

OTHER PUBLICATIONS

Allan Harvey, "Automatic Routing and Dispatching to Trucks and Trailers", Flow Magazine, May 1956, pp. 110 and 142.

Autoque™ brochure, Cybernated Automation Corporation.

Primary Examiner—Joseph E. Valenza
Assistant Examiner—Khoi H. Tran
Attorney, Agent, or Firm—Quarles & Brady

[57] ABSTRACT

A storage and conveying rack having respective sets of shelves which independently pivot in a coordinating manner on a rack in an orientation enabling articles to be conveyed downwardly, back and forth between the shelves;

a pivotably mounted cross bar extending transversely across each shelf and movable between an article receiving position and an article arresting position;

a respective damper for arresting motion of each cross bar when engaged by a conveyed article and moved from the article receiving position to the article rested position;

a respective bias for urging each cross bar from the article arrested position to the article receiving position; and, an optical sensor on each shelf for detecting an article's presence and supplying a control signal to the independently pivoting shelves in the coordinated manner.

14 Claims, 2 Drawing Sheets

ARTICLE RECEPTION SYSTEM FOR STORAGE AND DISPENSING APPARATUS

FIELD OF THE INVENTION

The invention relates to automated storage and dispensing systems for containers, articles and the like, utilizing staggered opposing shelves for receiving, storing and advancing articles as a container is dispensed from the system. More particularly, the invention relates to an article reception system for use in such systems to safely and reliably accommodate a variety of article shapes, sizes and weights.

BACKGROUND OF THE INVENTION

Vertically accumulating container storage and retrieval apparatus is shown by Grace, U.S. Pat. Nos. 4,621,745; Grace, 5,111,963; and Stingel et al., 5,285,928. The various embodiments disclosed in these patent consists of opposing stacks of vertically staggered shelves which are pivotable between an upwardly tilted, receiving position, a downwardly tilted, discharge position, and in some embodiments, an intermediate storage position. Movement of the shelves is controlled such that an upper shelf cannot pivot downwardly to the discharge position unless the next lower shelf is empty and in the upwardly tilted, receiving position.

In these systems, containers travel down the stack of opposing shelves in zig-zag fashion to come to rest at the lowest unoccupied shelf. Grace, U.S. Pat. No. 5,111,963, discloses a two-position shelf assembly which increases efficiency in some applications. The disclosures of U.S. Pat. Nos. 4,621,745 and 5,111,963 are incorporated herein by reference.

There is a continuing need for improved container storage and retrieval apparatus which are adaptable to special situations such as light product weight, variable product weight and heavy product weight. Prior apparatus may not work properly with very light weight containers, which do not have sufficient weight or momentum for mechanical actuation to function properly. Also, very heavy loads may cause jarring, vibration, excessive wear and improper operation and can contribute to breakage of fragile articles, such as glass containers.

During operation, a transferred container can topple or lodge between shelf assemblies if the receiving shelf assembly is not prevented from pivoting downwardly from the receiving position before the container is completely disposed on the receiving shelf surface. Accordingly, the descent of the receiving shelf assembly should be delayed until the container is fully received.

In earlier systems, as disclosed in Grace, U.S. Pat. No. 4,621,745, the shelf assemblies communicated the position and occupancy between shelves through mechanical linkages actuated by mechanical sensors, such as a pivotal cross bar extending transversely across each shelf. These mechanical components require minimum weights and sizes of the transferred articles to move the sensors and signal the presence of the containers. In later systems, pneumatic limit switches having mechanical roller actuators along the surface of the shelves have been used to improve reliability of container detection but still require minimum article weight to depress the roller actuator.

SUMMARY OF THE INVENTION

It is an object of the invention to improve the operation of the article storage and dispensing systems.

It is another object of the invention to increase the reliability of article detection on the shelf assemblies of the article storage and dispensing systems.

It is a further object of the invention to increase the range of article weights, sizes and shapes that can be accommodated by the article storage and dispensing systems.

It is yet another object of the invention to reduce damage to articles during transfer between the shelf assemblies.

These objects and other advantages are achieved by an article storage and dispensing system having an improved reception system. The reception system comprises an article sensor and a separate article arresting system, each disposed on the shelf assembly of the article storage and dispensing system.

The article sensor is preferably an electric photoeye mounted to a side of the shelf and providing a detection field extending across the article path above the shelf. The photoeye generates a signal dependent on the presence or absence of an article and directs this signal through appropriate cabling to the control system for the shelf assemblies movement. The photoeye can provide a signal to be used not only to verify the presence of an article before lowering of the shelf to its discharge position but also to indicate to the next higher, opposing shelf whether the shelf is empty.

Because this detection function is provided by the photoeye in a non-weight dependent manner, the articles can be as light as 4 oz. The use of the photoeye for article detection also allows the pivotal cross bar, which has been used for article detection in prior systems, to be dedicated to abutting and arresting the advance of an incoming article.

In this mode, the arresting assembly include the cross bar for engaging the advancing article. The cross bar can be pivotally connected to the shelf by lateral arm brackets to swing between a forward, article receiving position and a rearward, engaged position.

An oil filled damper is positioned between the arm bracket for the cross bar and the shelf to resist and damp the cross bar and article. This resistance slows the article to a smooth stop. The arresting system can further include biasing means for returning the cross bar to its forward position when the article is transferred.

Thus, the combination of the article sensor and separate arresting assembly provides an expanded range of article weights, shapes and sizes that can be safely and reliably accommodated by the article storage and dispensing systems discussed above.

BRIEF DESCRIPTION OF THE DRAWINGS

A greater understanding of the invention can be gained from a reading of the following detailed description of embodiments of the invention in conjunction with the accompanying drawing, in which.

DETAILED DESCRIPTION OF EMBODIMENTS OF THE INVENTION

The invention is directed to a reception system to improve the operation and versatility of the automatic container storage and dispensing systems using pivoting shelf assemblies, such as those embodiments disclosed in previous U.S. Pat. Nos. 5,285,928; 5,111,963 and 4,621,745. Through use of the reception system, these article storage and dispensing systems can accommodate a wider variety of article sizes, shapes, and weights and still reliably ensure the complete reception of the article before release to the next available level. The reception system simultaneously provides safe receipt with reduction or elimination in damage to the container.

Figure 1:
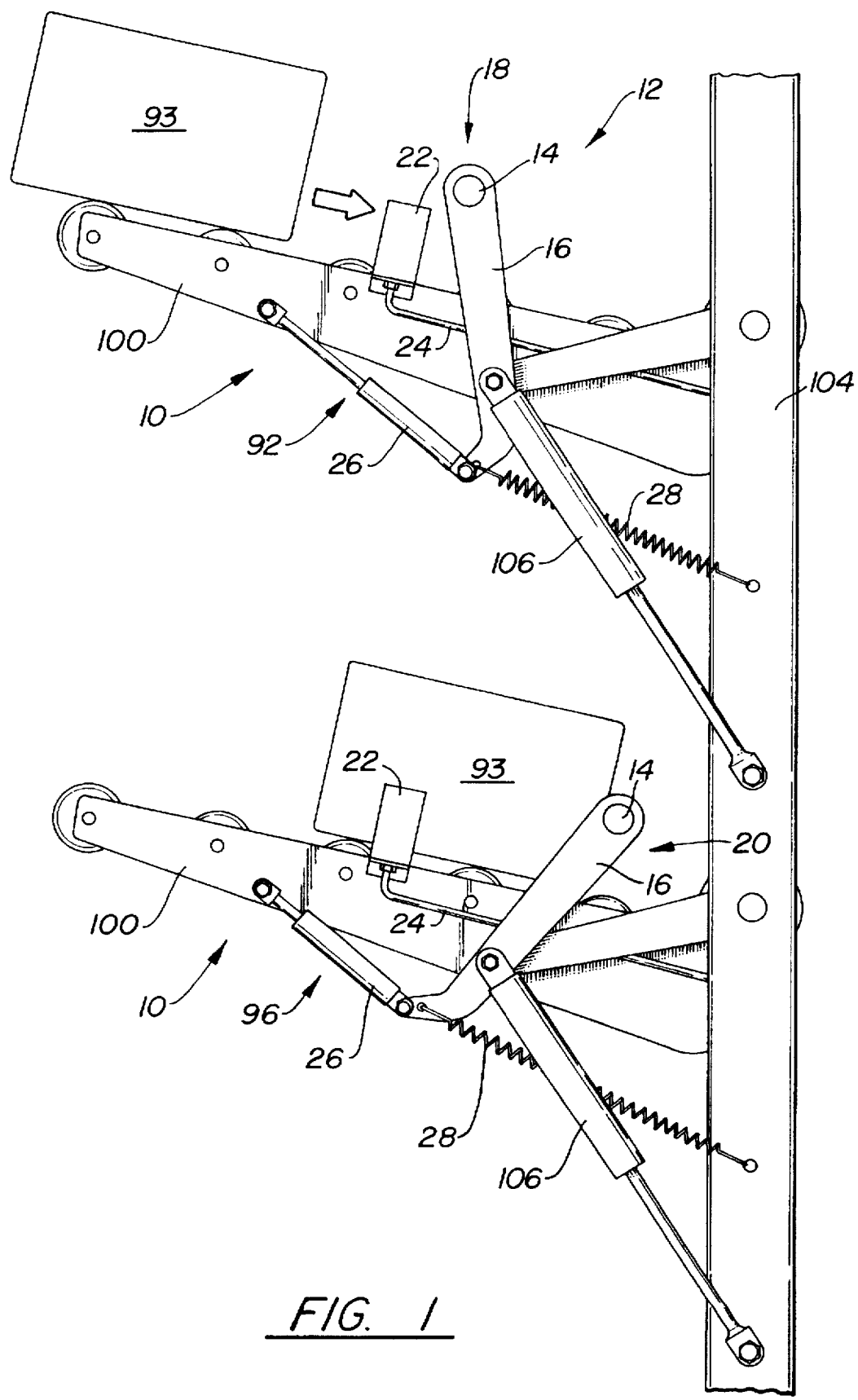
FIG. 1 is side elevational view of two exemplary shelf assemblies of an article storage and dispensing system using an embodiment of the reception system of the invention, each shelf depicting a different mode of the reception system.

Referring to the figures and particularly to FIG. 1, the reception system 10 is provided in conjunction with each shelf 100 of an automatic storage and dispensing system 12. The storage and dispensing system 12 is only partially illustrated. A broader discussion of a representative system is set forth below with reference to FIG. 2. Construction alternatives for the article storage and dispensing systems can be further gained from a reading of prior patents, U.S. Pat. Nos. 5,285,928, 5,111,963 and 4,621,745, the disclosures of which are incorporated by reference.

Figure 2:
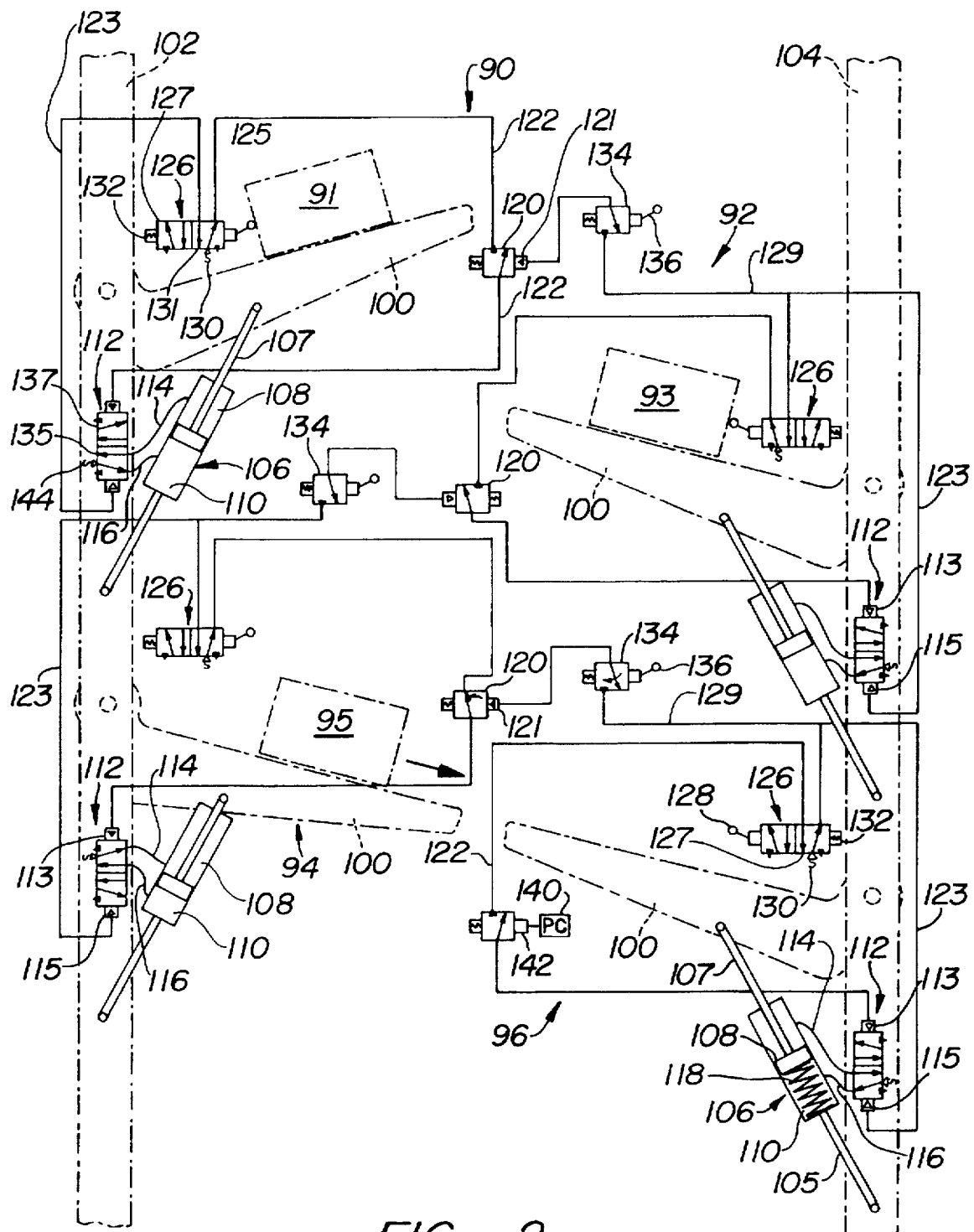
FIG. 2 is a representative article storage and dispensing system utilizing the reception system.

Referring briefly to FIG. 2, the shelves 100 are pivotally arranged on supporting structure such as a frame tower 102, 104 in vertically staggered stacks with the free ends of each stack of shelves 100 facing the free ends of the opposing stack of shelves 100.

Again in FIG. 1, the upper shelf assembly 92 depicts the condition of the reception system 10 in an empty state, prepared to receive an article 93. The lower shelf assembly 96 illustrates the occupied state in which the container 93 is fully stored on the shelf 100. A cross bar 14 (the length of which is not shown) extends transversely across the shelf 100 and is pivotally mounted through lateral bracket arms 16 to the shelf 100 for motion from a forward, receiving position 18, as shown arranged in the upper shelf assembly 92, and a rearward, engaged position 20, as arranged in the lower shelf assembly 96.

In prior systems, such as the system disclosed in U.S. Pat. No. 5,111,963, this cross bar assembly served a dual function of engaging and abutting the further travel of an article sliding onto the shelf and of indicating the presence of the article on the shelf.

In the present invention, the reception system comprises an article sensor and a separate article arrest assembly that reliably verify the receipt of the article and bring the article to a controlled stop in a stored position on the shelf. Together, the sensor and arrest assembly of the reception system permits the shelf to reliably and safely receive articles and containers of odd shapes and varying levels of fragility, making the storage and dispensing system more appropriate for use in miscellaneous item inventory control, including the handling of glass products, such as drink containers.

The article sensor can include an electric photoeye 22, positioned on the shelf 100 to sense the presence of the article 93 on the shelf 100. The photoeye 22 is preferably a Model No. 42GTU-900 manufactured by Allen-Bradley. The photoeye 22 can be mounted to a side of the shelf 100 using a bracket extending from the side of the shelf 100 and providing an aperture for threading the base of the photoeye 22. Other conventional fasteners can be used to secure the photoeye 22 to the shelf 100 on the side or in other locations provided the photoeye does not obstruct the passage of an article onto and off of the shelf 100. The photoeye 22 detects the passage of the article 93 and supplies a signal that can be electrical routed through a cable 24 to a control system for the interaction of the shelves of the storage and dispensing system (FIG. 2). The signal is preferably delayed approximately 1 second using known electrical signal delay circuitry to ensure that the article 93 is completely received on the shelf 100 before motion of the shelf 100 is permitted.

As discussed more fully below, the signal of container presence from the electric photoeye 22 can be used to electrically identify that the shelf 100 is prepared to transfer the article 93 to the next lower, opposing shelf (FIG. 2) if that shelf is empty and otherwise ready to receive an article. If the next lower, opposing shelf is prepared, the electric eye signal 22 can actuate a pneumatic control valve to supply pressure to the upper chamber of the air cylinder 106 while exhausting pressure from the lower chamber to permit the shelf 100 to pivot to a container release position and transfer the container 93 to the next lower, opposing shelf.

The electric eye signal in the cable 24 can also indicate to the control system for the next higher, opposing shelf (See FIG. 2) whether the shelf 100 is empty. This signal coupled with a separate signal from a shelf position indicator (FIG. 2) that the shelf is in an upward, receiving position, can permit the control system to lower an occupied, next higher shelf to transfer its contents.

The use of the electric eye 22 enables each shelf assembly 92, 96 to receive articles having very light weights as little as 4 oz. because a minimum weight is no longer required to mechanically activate an indicator arm or roller valve along the shelf surface.

The electric eye 22 also provides the detection of container presence or absence, permitting use of the cross bar 14 as a dedicated arresting system for engaging and slowing the received container 93 to a smooth stop. In this role, the arrest system includes a damper, such as an oil filled piston 26, secured between the arm bracket 16 and the shelf 100 to absorb the initial impact between the sliding container 93 and the cross bar 14 and controlling the deceleration of the article 93. The arrest system further provides biasing means, such as a return spring 28 mounted between the arm bracket 16 and the frame 104 to pivot the cross bar 14 to the receiving position by the weight of the article 93 when received.

A representative article storage and dispensing system capable of using the reception system is set forth below. Other variations and embodiments of the article storage and dispensing system can also benefit from the reception system and that the invention should not be limited by the details of the storage and dispensing system disclosed herein.

Referring to FIG. 2, the container storage and dispensing system can generally include two opposing, substantially vertical stacks of staggered shelf assemblies 90, 92, 94 and 96 mounted on support structure. The stacks can consist of any number of shelf assemblies, but the shelf assemblies 90, 92, 94 and 96 are shown in the drawings for purposes of explanation and illustration. The support structure is preferably a framework, such as a free standing tower, which has substantially vertical columns 102 and 104. The columns can be laterally supported by cross members.

Each shelf assembly includes a shelf 100 for receiving, storing and discharging containers. Each shelf 100 is pivotally mounted relative to the support structure for movement at least between an upwardly tilted receiving position, illustrated by the shelf assembly 96, and a downwardly tilted discharge position, illustrated by the shelf assembly 94. One or more intermediate storage positions are also possible. The free ends of the shelves of each stack extend toward the free ends of the opposing stack. The forward end of a shelf assembly 94 is depicted in the downwardly tilted discharge position which preferably aligns with the free end of a next lower, opposing shelf 96 in the upwardly tilted receiving position to allow for the smooth transfer of a container 95 from the upper shelf to the next lower, opposing shelf.

Containers are introduced to the apparatus at or near the top of the stacks. A biased ramp (not shown) can be provided to receive containers at the top of the apparatus and pivot under the weight of containers to transfer the containers to the first, uppermost shelf assembly 90. The containers are transferred sequentially downward in a zig-zag manner through the stacks, from one shelf to the next lower shelf, and each container descends through the stacks until it is disposed on the lowest unfilled shelf. The system can include a fixed, upwardly tilted dispensing ramp to dispense containers discharged from the lowest shelf assembly 96 to external structure, such as a conveyor belt.

Each shelf 100 is pivotally attached to the vertical support structure, such as between the columns 102 and 104, for movement at least between an upwardly tilted receiving position, as shown, and a downwardly tilted discharge position. A raising means such as a pneumatic air cylinder is provided for driving the shelf 100 to the receiving position when the shelf is empty, but allowing descent when a container is present on the shelf 100. The receiving position can also serve as a storing position for a container. The container will occupy a shelf until the next lower shelf assembly is prepared to receive the container. The tilt angles of the receiving and discharge positions relative to horizontal can be varied, but preferably are between 5 and 20 degrees. One or more intermediate storage positions, preferably at or near the horizontal, are also possible.

The system utilizes fluid-operated control components, which have been found to be particularly desirable for light-weight containers and packages. In addition to light-weight applications, the fluid-controlled system may be appropriate for heavy-weight applications, perhaps of 100 pounds or more.

A fluid-controlled embodiment of the system can include double acting fluid cylinders that are controlled to raise and lower the shelves. Air is a preferable fluid, although other gases or liquids such as oil could alternatively be utilized. The lowering of the shelves can be accomplished by suitable connections to a lowering cylinder or to the lowering side of a double-acting cylinder, or by the exhaust of pressure to a raising cylinder.

The shelves, support structure and containers are represented schematically and in phantom in FIG. 2, it being understood that the details of these components can be constructed according to known engineering principles. The array of valves and air lines in the control system of the disclosed embodiment is illustrated schematically to more clearly show the operation of the fluid-operated control system relative to the operation of the shelves. The various valves can be mounted to the support structure and shelves in any fashion that is suitable to permit actuation according to the position of the shelves and the associated containers in the manner to be described. The valves are depicted in conventional pneumatic logic symbology, with adjacent boxes schematically representing the alternate operational configurations of the valves. It should be appreciated, however, that alternative logic designs and control configurations can be designed and preferably utilizing known components to minimize the amount or length of pneumatic line required, and the invention is not intended to be limited to that disclosed herein.

The valves can be selected from several conventional pneumatic valve constructions, such as four-way spool valves, and can be actuated by an electric signal from the photoeye 22 (FIG. 1). For example, the signal from the electric eye 22 can operate a solenoid to manipulate the position of a four-way spool valve in a known manner.

The shelf raising means is preferably a pneumatic cylinder, such as the double acting air cylinder 106. The shelf raising means provides for movement of the shelf 100 at least between an upwardly tilted receiving position, as shown by the shelf assembly 96 and a downwardly tilted discharge position, shown by the shelf assembly 94. The air cylinder 106 can be attached between the shelf 100 and the support structure by suitable structure such as a strut 105 and a piston arm 107. The air cylinder 106 can include an upper chamber 108 and a lower chamber 110 that are pneumatically connected to a cylinder control valve 112 through lines 114 and 116, respectively. The cylinder control valve 112, which can be a four-way, double air pilot spool valve, can be configured to selectively provide supply pressure to either the upper chamber 108 or to the lower chamber 110, while exhausting the non-supplied chamber.

When placed in the raising configuration, the cylinder control valve 112 ports supply pressure to the lower chamber 110 through the air line 116. Simultaneously, the upper chamber 108 is exhausted through the line 114. The cylinder control valve 112 can alternatively be placed in a lowering configuration, as shown by the shelf assembly 94 in FIG. 2, wherein pressure is provided to the upper chamber 108 through the line 114 and the lower chamber 110 is exhausted through the line 116. The relative rates of pressurization and exhaust of the opposing chambers 108 and 110 can be regulated to insure smooth raising and lowering of each shelf 100.

In the event of an air supply failure, the air pressure in the air cylinder may be discharged, causing raised shelves to lower prematurely. Accordingly, the air cylinder 106 can be equipped with a return spring for maintaining the shelf 100 in the raised position in the absence of air pressure.

The positioning of a shelf 100 between the upwardly tilted receiving position and downwardly tilted discharge position, and the movement of the cylinder control valve 112 between the raising configuration and the lowering configuration, are preferably dependent upon two factors. First, an upwardly tilted shelf should remain in that position so long as the shelf does not have a container, so as to be in a position to receive a container. Second, a shelf should remain upwardly tilted or in an intermediate storage position so long as the next lower shelf assembly is not prepared to receive a container. A shelf can be adapted to move to an intermediate storage position if it has a container and the next lower shelf is unprepared to receive a container.

The pneumatic control system is constructed so as to maintain the cylinder control valve 112 in the raising configuration if the shelf 100 is empty, or in the raising configuration or an intermediate storage configuration if the next lower shelf assembly has a container or is not prepared to receive a container.

The container indicator structure includes a container indicator valve 126 to detect the presence of a container on each shelf 100. The container indicator valve 126, which is shown in pneumatic logic symbology, can be a four-way spool valve, and includes a first configuration illustrated within the box 125 of shelf assembly 90. The box 125 represents the porting of a supply source 130 to a line 122, and the porting of an exhaust outlet 131 to a line 123. A second configuration, illustrated by the box 127, represents the porting of the supply source 130 to the line 123, and the porting of the exhaust 131 to the line 122.

The valve 126 is operated by a signal from the electric photoeye which responds to the presence or absence of a container on the shelf. When the container 91 is present on the shelf 100, the indicator valve 126 is oriented to the position, in which flow from the supply source 130 is routed as a lowering signal through the air line 122 to the gate 113 of cylinder control valve 112, while the line 123 is exhausted. The cylinder control valve 112 will therefore be moved from the raising configuration to the lowering configuration. This will port air to the upper chamber 108 of the air cylinder 106 to lower the shelf 100. A return spring 132 can be utilized to position the valve 126 in the second configuration 127 when a container is removed from the shelf 100, as illustrated by the shelf assembly 96 in FIG. 2. In this orientation, the line 122 is exhausted and a raising signal is routed through the line 123 to the gate 115. The cylinder control valve 112 will be placed in the raising configuration to raise the shelf 100.

The pneumatic system can also include transfer control structure operatively connecting the shelf assembly with the next lower shelf assembly. The transfer control structure of a shelf assembly, for example of the shelf assembly 90, applies the condition of the next lower shelf assembly to the positioning of the shelf 100 of the upper shelf assembly 90, so that the shelf assembly 90 will not be lowered to the discharge position unless the next lower shelf assembly 92 is prepared to receive a container.

The transfer control structure can include a normally open three-way transfer valve 120 for controlling the passage of a lowering signal through the line 122 to the cylinder control valve 112, according to whether the next lower shelf assembly is presently storing a container. The transfer valve 120 in either the open or closed condition is controlled by the configuration of the container indicator valve 126 of the next lower shelf assembly. An air line 129 taken, for example, from the air line 123 can be utilized to apply a transfer signal to the gate 121 when the container indicator valve 126 is in the raising configuration. The presence of the transfer signal at the gate 121 is operable to close the transfer valve 120 to permit the lowering signal of the container indicator valve 126 of the shelf assembly 90 to pass to the cylinder control valve 112, which will effect lowering of the shelf 100 and transfer of the container.

The open condition of the transfer valve 120 occurs when the next lower shelf assembly is unprepared to receive a container, in which case the transfer signal is not generated through the line 129. The open condition of the transfer valve 120 prevents the lowering signal of the container indicator valve 126 from reaching and actuating the cylinder control valve 112 of the upper shelf assembly. When the next lower shelf assembly has discharged a container and is prepared to a receive another container, the container indicator valve 126 of that shelf assembly changes configuration and a transfer signal is generated through the line 129 to close the transfer stop valve 120 again. This permits the lowering signal to pass through the line 122 to the cylinder control valve 112 to initiate the lowering of the shelf 100 of the upper shelf assembly if that shelf assembly has a container.

The container indicator valve 126 of the next lower shelf assembly can possibly forward a transfer signal to the upper shelf assembly before the next lower shelf assembly is in the fully upright position, ready to receive a container. This can cause mishaps during the container transferring process. The transfer control structure therefore preferably also includes a receiving position indicator valve 134 which prevents the passage of the transfer signal to the transfer valve 120 until the shelf 100 of the next lower shelf assembly is fully disposed in the receiving position. The receiving position indicator valve 134 can be a normally open three-way valve connected to the support structure and equipped with a mechanical actuator 136 or other structure for contacting or otherwise sensing the position of the shelf 100 of the next lower shelf assembly. The mechanical actuator 136 closes the receiving position indicator valve 134 when the shelf 100 of the next lower shelf assembly is fully in the upwardly tilted, container receiving position, and opens the receiving position indicator valve 134 when the shelf 100 is not fully in the receiving position.

The container indicator valve 126 is preferably positioned on the shelf 100 such that the electric photoeye extends slightly above the support surface of the shelf to transmit a sensing field across the shelf surface. The container indicator valve 126 and photoeye can sense when the container is received on the shelf 100, and a delay can be used to allow the container time to fully transfer onto the shelf.

The container indicator valve 126 thereby can also serve as a container position indicator for delaying the discharge of a container until a container is fully received on the shelf 100.

Thus, the reception system disclosed herein can improved the performance of the described storage and dispensing systems. The photoeye provides reliable container presence indication independent of weight and size and allows the cross bar assembly to be dedicated as an arrest system to safely bring article of varying size, shape, weight and fragility to a smooth stop. Although details of embodiments of the invention have been described, it is intended that the invention not be so limited but rather only by the scope of the following claims.

I claim:

1. A storage and conveying apparatus, comprising:

a rack;

respective sets of shelves pivotably supported on said rack and facing one another in a staggered orientation enabling articles to be conveyed downwardly from an upper shelf to a lower shelf, back and forth between said shelves of said respective sets as said shelves are pivoted upwardly and downwardly in a coordinated manner;

a pivotably mounted cross bar extending transversely across each shelf and movable between an article receiving position and an article arrested position;

means operating independently of said cross bar for independently pivoting said shelves in said coordinated manner;

a respective damper for arresting motion of each said cross bar when engaged by a conveyed article and moved from said article receiving position to said article arrested position; and, respective biasing means for urging each said cross bar from said article arrested position to said article receiving position.

2. The apparatus of claim 1, further comprising an optical sensor on each said shelf for detecting an article's presence and supplying a control signal to said means for independently pivoting said shelves in said coordinated manner.

3. The apparatus of claim 1, wherein each said shelf comprises a plurality of article supporting rollers.

4. The apparatus of claim 1, wherein said means for independently pivoting said shelves comprises piston assemblies responsive to fluid pressure.

5. The apparatus of claim 4, further comprising means for moving said shelves into an upwardly pivoted position responsive to a failure of said fluid pressure.

6. A storage and conveying apparatus, comprising:

a rack;

respective sets of shelves pivotably supported on said rack and facing one another in a staggered orientation enabling articles to be conveyed downwardly from an upper shelf to a lower shelf, back and forth between said shelves of said respective sets as said shelves are pivoted upwardly and downwardly in a coordinated manner;

means for independently pivoting said shelves in said coordinated manner;

an optical sensor on each said shelf for detecting an article's presence and exclusively supplying a control signal to said means for independently pivoting said shelves in said coordinated manner;

a pivotably mounted cross bar extending transversely across each shelf and movable between an article receiving position and an article arrested position; and, a respective damper for arresting motion of each said cross bar when engaged by a conveyed article and moved from said article receiving position to said article arrested position.

7. The apparatus of claim 6, further comprising respective biasing means for urging each said cross bar from said article arrested position to said article receiving position.

8. The apparatus of claim 6, wherein each said shelf comprises a plurality of article supporting rollers.

9. The apparatus of claim 6, wherein said means for independently pivoting said shelves comprises piston assemblies responsive to fluid pressure.

10. The apparatus of claim 9, further comprising means for moving said shelves into an upwardly pivoted position responsive to a failure of said fluid pressure.

11. A storage and conveying rack, comprising:

respective sets of shelves pivotably supported on said rack and facing one another in a staggered orientation enabling articles to be conveyed downwardly from an upper shelf to a lower shelf, back and forth between said shelves of said respective sets as said shelves are pivoted upwardly and downwardly in a coordinated manner;

means for independently pivoting said shelves in said coordinated manner;

a pivotably mounted cross bar extending transversely across each shelf and movable between an article receiving position and an article arrested position;

a respective damper for arresting motion of each said cross bar when engaged by a conveyed article and moved from said article receiving position to said article arrested position;

respective biasing means for urging each said cross bar from said article arrested position to said article receiving position; and, an optical sensor on each said shelf for detecting an article's presence independently of said cross bar and supplying a control signal to said means for independently pivoting said shelves in said coordinated manner.

12. The apparatus of claim 11, wherein each said shelf comprises a plurality of article supporting rollers.

13. The apparatus of claim 11, wherein said means for independently pivoting said shelves comprises piston assemblies responsive to fluid pressure.

14. The apparatus of claim 13, further comprising means for moving said shelves into an upwardly pivoted position responsive to a failure of said fluid pressure.

* * * * *